(No Model.)
J. REID.
WATER FILTER.
No. 291,083. Patented Jan. 1, 1884.
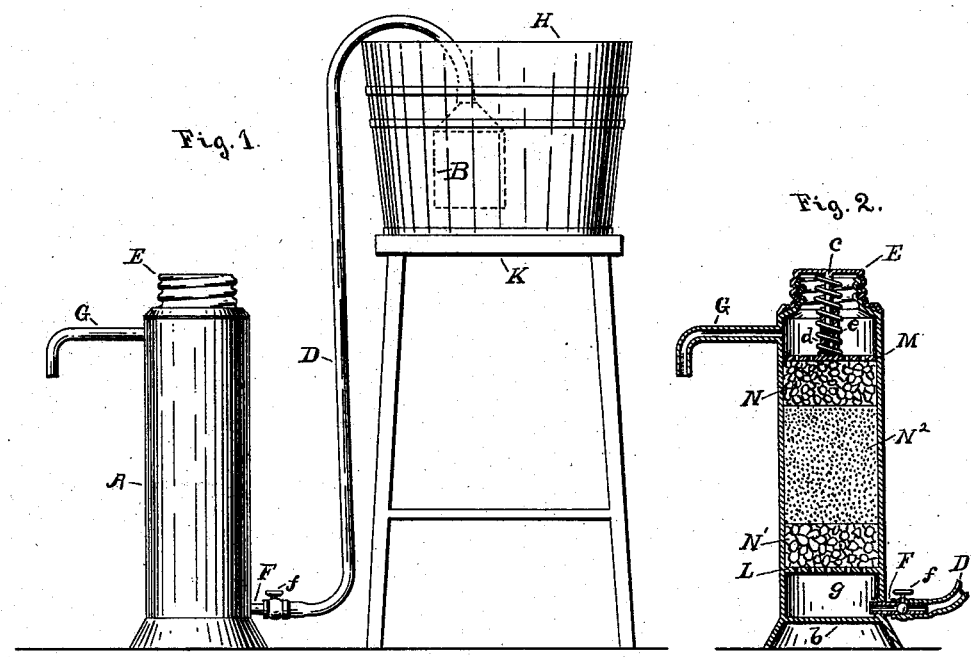
WITNESSES.
Geo. H. Storm.
K. F. Delano
John Reid
by
Howard Bros.
INVENTOR
ATTORNEYS.

UNITED STATES PATENT OFFICE.

JOHN REID, OF WHEELING, WEST VIRGINIA.

WATER-FILTER.

SPECIFICATION forming part of Letters Patent No. 291,083, dated January 1, 1884.

Application filed April 9, 1883. (No model.)

*To all whom it may concern:*

Be it known that I, JOHN REID, a resident of the city of Wheeling, in the county of Ohio and State of West Virginia, have invented certain new and useful Improvements in Water-Filters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to provide a portable filter for household use that will be effective in its operation, inexpensive in its construction, and easily cleaned.

My invention consists of a cylindrical case similar in form to a water-cooler, containing suitable filtering material, said case having a removable head or screw-top for convenience in cleaning the inside, and fitted with an inlet-pipe connection at the bottom, to which is connected a rubber pipe of suitable length, having attached to its end a cup or funnel containing a sponge or strainer. This cup is to be placed in the barrel or vessel containing the water to be filtered, and operates in the manner of a siphon to convey the water from the barrel to the filter.

In the drawings, Figure 1 is a view illustrating the filter in use; Fig. 2, a vertical central section, showing the construction; Fig. 3, a view of two filters combined.

Like letters of reference refer to like parts.

The letter A represents the case of the filter, made preferably of sheet metal, having a closed bottom, *b*, and provided at the upper end with a removable screw cap or lid, E, for convenience in removing the filtering material and for cleaning purposes.

L is a perforated partition, secured to the case of the filter.

N N' are layers of gravel, one at each end of the filter-space.

N² is a bed of charcoal interposed between the layers of gravel.

M is a removable perforated disk or head, having a short upright tube, *d*, in the center.

*c* is a stem attached to the center of the screw-cap, extending down into the tube on the disk.

*e* is a spiral spring surrounding the tube and stem, secured at the end to the disk, and operates by pressure against the cap and disk to hold the filtering material in place.

G is the spout, secured to the case above the filtering material.

F is a pipe-connection screwed into an opening at the bottom of the case, provided with a valve, *f*. This tube is placed close to the bottom of the case A, in order that the water-chamber *g* can be readily cleaned out, the tube being removed for this purpose.

D is a rubber pipe similar to that in general use for purposes of this kind. One end is slipped over the end of the pipe F. Attached to the other end of the rubber tube is a cylindrical cup, B, having a screw-thread, *h*, formed on the outer end, and containing a sponge, C, or similar filtering material.

H is a tub containing water to be filtered.

K is a stand to support the tub.

In Fig. 3, A A' are filters similar to those described, with the exception that the pipe F at the bottom is connected to each filter, and fitted with a valve, *f*, similar to that described above, and provided for the same purpose. A tube, *m*, is inserted in the screw-cap and the rubber pipe attached to it, instead of at the bottom, as in the single filter. A bar, *n*, connects the two cylinders at the top, and serves as a handle to lift the same.

The mode of operation is as follows: The cup B is held in the water until the sponge C has absorbed all the water it will hold. The cup is then held upright until the rubber pipe is full of water. Then it is dropped back into the vessel. The tube thus becomes a siphon and exhausts all the water out of the vessel, from whence it passes into and upward through the filter. Where two filters are combined to insure more perfect filtration, the water is admitted at the top of one of the filters and passed downward through it and upward through the other.

My invention is particularly useful in filtering water that has been collected in barrels or tubs, either from the city service or roof-water; but by means of the screw-thread on the end of the cup it can easily be attached to a screw-threaded faucet on a hydrant or pump, and filter the water as it passes through in the same way. By means of the removable screw-cap, the filtering material can readily be removed and the filter made sweet and clean, and replenished with other materials with but a few moments' work. The sponge in the cup or reservoir prevents the larger particles of mud or dirt from passing into the body of the filter. When it gets filled with sediment, it can readily be removed, washed out, and put back again. The removable perforated disk accommodates itself to the amount of filtering materials there is in the case by means of a spiral spring around the sliding stem, and as the filtering material settles in the case, it follows it down and prevents the particles from rising and passing off with the water.

It is obvious that the rubber tube, with the sponge-cup attached, could be connected to any other kind of a filter than that herein shown, and accomplish the same results.

Having described my invention, what I claim, and desire to secure by Letters Patent of the United States, is—

1. The combination, with the filtering apparatus, consisting of the case A, suitable inlet and outlet openings, and perforated diaphragms inclosing suitable filtering material, of the pipe D and cup B, said cup containing filtering material, and adapted to operate in connection with the filter, as set forth.

2. The combination, in a filtering apparatus, of the case A, having an inlet-pipe, F, at the bottom, outlet-pipe G at the top, perforated partition L, filtering material $N\ N'\ N^2$, removable perforated disk or head M, with central tube, $d$, spiral spring $c$, screw-cap E, central stud, $e$, secured to the under side, rubber pipe D, cup B, and sponge C, substantially as and for the purpose herein described.

In testimony that I do claim the foregoing as my own I hereby affix my signature in presence of two witnesses.

JOHN REID.

Witnesses:
 JOSEPH VOGLER, Jr.,
 E. B. HOWARD.